United States Patent [19]

Nagasaka et al.

[11] Patent Number: 4,747,731
[45] Date of Patent: May 31, 1988

[54] AUTOMATIC POWDER FEEDING APPARATUS

[75] Inventors: Hideo Nagasaka, 2-21-33, Minamikohya-cho, Hitachi-shi, Ibaraki-ken; Tsutomu Itoh, Tokyo; Tadao Morita, Chiba; Masahiro Yamamoto, Sakura, all of Japan

[73] Assignees: Hideo Nagasaka, Ibaraki; Onoda Cement Co., Ltd., Yamaguchi, both of Japan

[21] Appl. No.: 27,187

[22] Filed: Mar. 17, 1987

[30] Foreign Application Priority Data

Mar. 25, 1986 [JP] Japan ................... 61-66644

[51] Int. Cl.$^4$ ............................ B65G 53/66
[52] U.S. Cl. ...................... 406/14; 406/31; 406/152
[58] Field of Search .................. 406/14, 30

[56] References Cited

U.S. PATENT DOCUMENTS

4,480,947 11/1984 Nagasaka .................... 406/14

Primary Examiner—Joseph F. Peters, Jr.
Assistant Examiner—James M. Kannofsky
Attorney, Agent, or Firm—Price, Heneveld, Cooper, DeWitt & Litton

[57] ABSTRACT

In an automatic powder feeding apparatus of the type that the apparatus comprises a sensor nozzle for blowing a carrier fluid into an inlet of a detector tubular passageway having an inlet and an outlet, apparatus for detecting a pressure difference between an inlet side pressure detecting port provided upstream of the outlet of the sensor nozzle and an outlet side pressure detecting port provided at the outlet of the detector tubular passageway, apparatus for shunting a part of the carrier fluid to the inlet side pressure detecting port and regulating a pressure at the outlet of the detector tubular passageway, the apparatus for regulating a pressure at the outlet of the detector tubular passageway being an injector connected via a valve to the outlet, and an automatic control valve having the pressure difference applied as its input and a flow rate of a driving fluid of the injector issued as its control output and including apparatus for presetting a set value corresponding to the pressure difference, in order to obviate a transient increasing phenomenon of a powder flow rate occurring upon starting for recommencing an operation from an operation stop condition and to obtain a stable powder flow rate from the moment of starting, the automatic control valve and the outlet side pressure detecting port are connected with each other via a three-way valve.

12 Claims, 5 Drawing Sheets

AUTOMATIC POWDER FEEDING APPARATUS

BACKGROUND OF THE INVENTION

The present invention relates to improvements in a measuring and controlling apparatus for a flow rate of powder carried by gas.

Heretofore, as the above-described type of apparatus, an automatic powder feeding apparatus invented by one of the inventors of this invention, for which a patent application was filed (See Japanese Patent Application No. 60-204978), comprising a nozzle for blowing a carrier fluid into an inlet of a detector tubular passageway having an inlet and an outlet, means for detecting a pressure difference between an inlet side pressure detecting port provided upstream of the outlet of the nozzle and an outlet side pressure detecting port provided at the outlet of the detector tubular passageway, means for shunting apart of the carrier fluid to the inlet side pressure detecting port and regulating a pressure at the outlet of the detector tubular passageway, means for regulating a pressure at the inlet of the detector tubular passageway, the means for regulating a pressure at the outlet of the detector tubular passageway being an injector connected via a valve to that outlet, and an automatic control valve having the pressure difference applied as its input and a flow rate of a driving fluid of the injector issued as its control output and including means for presetting a set value corresponding to the pressure difference, has been known.

Figure 7:
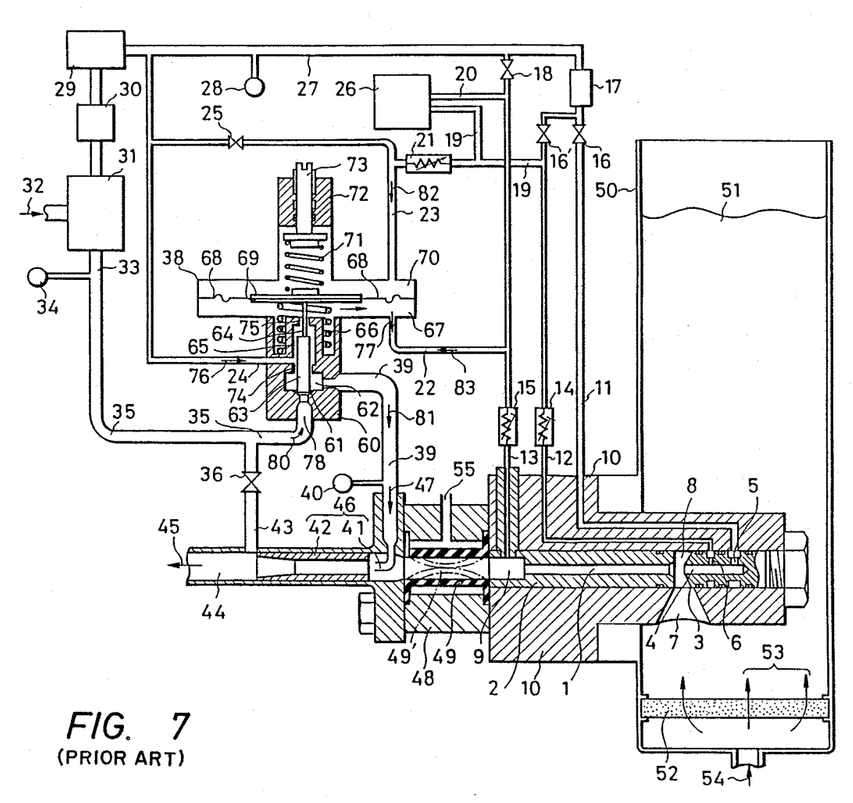
FIG. 7 is a front view, partly in cross-section, of a powder flow rate measuring apparatus in the prior art.

This apparatus in the prior art will be explained in more detail with reference to FIG. 7, as follows.

There is provided a sensor nozzle 3 for feeding a carrier gas into a detector tubular passageway 1, and a carrier gas having its flow rate regulated by a valve 16 is introduced thereto through a carrier gas feed port 5. In addition, an inlet pressure detecting port 6 opens upstream of a sensor nozzle port 4 of the sensor nozzle 3, and a part of the carrier gas having its flow rate controlled by a valve 16' is fed to that port 6 via an inlet side fluid resistance 14 and through a tubular passageway 12. In this instance, as shown in FIG. 7, a flow meter 17 is connected in such manner that a total flow rate of a carrier gas which flows through a valve 16 and the valve 16' and is finally blown into the detector tubular passageway 1 having been joined together through the sensor nozzle port 4, can be measured. As shown in the figure, a sensor tube 2 is supported coaxially with the sensor nozzle 3 and fixed in position in the axial direction by a sensor body 10. A powder layer 51 in a tank 50 is fluidized by gas 54 fed through a perforated plate 52 disposed at the bottom of the tank 50 as shown by arrows 53, and the powder in the powder layer 51 is introduced through a powder introducing pot 7 towards an inlet 8 of the detector tubular passageway 1 between the sensor tube 2 and the sensor nozzle 3. The sensor body 10 is fixedly mounted to the tank 50. At an outlet 9 of the sensor tube 2 is opened an outlet side pressure duct 13, and a predetermined gas is adapted to be introduced to this outlet 9 via an outlet side fluid resistance 15 as controlled by an outlet pressure shift valve 18. It is to be noted that reference numeral 26 designates a diaphragm type differential pressure gauge, and this gauge is adapted to detect a difference between the pressures at the detector tubular passageway outlet 9 and at the detector tubular passageway inlet 8, which are respectively picked up in the outlet side pressure duct 13 and in the inlet pressure detecting port 6 and applied to the differential pressure gauge through a differential pressure gauge lower pressure duct 20 and a differential pressure gauge higher pressure duct 19, respectively. The pressure difference detected by the differential pressure gauge 26 in the above-described manner, is a pressure difference generated in the process in which powder is introduced through the powder introducing port 7 into the detector tubular passageway 1 and is accelerated by a carrier gas blown into the detector tubular passageway 1 through the sensor nozzle port 4. In addition, to the outlet 9 of the sensor tube 2 is connected an injector 46 via a valve such as a pinch rubber 49 or the like.

This pinch rubber 49 is contained in a pinch valve body 48 and communicates with a pressurizing hole 55 drilled in the pinch valve body 48. By charging and discharging pressurized air through the pressurizing hole 55, the passageway inside of the pinch rubber 49 can be closed and opened, respectively. In FIG. 7, a pinch rubber 49a depicted by dash-dot lines shows a closed state of the pinch rubber 49 as a result of elastic deformation.

In this powder flow rate measuring apparatus, in the case where it is desired to change a flow rate of powder, it is achieved by changing a flow rate of a driving gas 47 in an injector 46 which consists of an injector nozzle 41 and an injector throat 42, and by adjusting a degree of vacuum at the outlet 9 of the detector tubular passageway 1. In the event that a transporting speed of powder is too low in a transporting pipe 44 at the injector outlet, an appropriate transporting speed could be realized by providing a carrier gas adjusting duct 43 at the outlet of the injector throat 42 and introducing an additional gas through this duct 43. In this case, a flow rate of the additional carrier gas can be set by means of a carrier gas adjusting valve 36. A control valve 38 is a control valve used for the purpose of maintaining a powder flow rate detected by a powder flow rate measuring apparatus in the prior art at a predetermined constant value. More particularly, the control valve 38 operates in such manner that it compares a difference between the pressures introduced, respectively, through a control valve lower pressure duct 22 and a control valve higher pressure duct 23 with a preset value stored therein, it amplifies the pressure difference by means of a diaphragm contained therein. As a result it converts a source pressure applied through a control valve source pressure duct 35 and controlled at a fixed value into the driving gas 46, and it feeds the driving gas 47 to the injector 46. In addition, a control valve constant pressure duct 24 is a duct for introducing into the control apparatus a constant pressure which is necessary for the control valve to precisely amplify a minute gas pressure difference and reveal its function. Also, a valve 25 is a powder flow rate setting valve for making a constant pressure gas given by a constant pressure valve 29 flow through a fluid resistance 21 and for adding a pressure to the pressure at the inlet side pressure detecting port 6 that is given by the duct 19, for the purpose of setting. As controlled by this powder flow rate setting velve 25, a constant minute flow rate of gas passes through a powder flow rate setting fluid resistance 21, then passes through the differential pressure gauge higher pressure duct 19, and after passing through the inlet side fluid resistance 14, it joins with a carrier gas blown into the detector tubular passageway 1 through the sensor nozzle 3. Hence essentially it is a part of a carrier gas and could be fed in parallel to the valves 16 and 16', but since this flow rate is always constant, the gas feed piping connection could be made as shown in FIG. 7.

The operation of this control valve 38 is such that in the case where a level of fluidized powder 51 of the powder in the tank 50 has changed as, for instance, the flow rate of the powder has decreased, the control valve 38 acts to increase the flow rate of the driving gas 47 fed to the injector nozzle 41 and thereby restore the powder flow rate to the original value. On the contrary, in the case where the powder flow rate has increased, a degree of vacuum in the injector is lowered by reducing the flow rate of the driving gas 47, and thereby the powder flow rate may be automatically held constant.

This control valve 38 consists of a control valve higher pressure chamber 70 on the upper side and a control valve lower pressure chamber 67 on the lower side with a diaphragm 68 intervening therebetween, and a central portion of the diaphragm 68 is reinforced by center plates 69. Under the control valve lower pressure chamber 67 is provided a control valve body 60, and a control valve source pressure gas 80 having a precisely controlled constant pressure is introduced through the bottom of the body 60 via the duct 35. In the upper portion of the control valve body 60, a control valve main shaft 63 is fitted along a center axis of the control valve body 60 so as to be slidable in the vertical directions as opposed to a control valve port 61, the upper portion of the control valve main shaft 63 transforms to a thin control valve auxiliary shaft 64, whose tip end connects to the center plate 69, and a flow rate of the source pressure gas in the control valve is controlled through a narrow gap between the entire circumference of the bottom surface of the control valve main shaft 63 and the control valve port 61 so that the source pressure gas may pass through a control valve output chamber 62 and may flow out from a control valve output chamber 39 as shown by an arrow 81. It is to be noted that reference numerals indicated in FIG. 7 and identical to those given to component parts shown in FIG. 1 which will be described later, designate component parts having the same names and the same functions.

When the above-described apparatus in the prior art is stopped from its operating state, if the pinch rubber 49 is closed as described above, then a flow of carrier gas passing through the detector tubular passageway 1 towards the outlet 9 will stop and at the same time a flow of purging gas passing through the fluid resistance 15 and the outlet pressure introducing tube 13 towards the outlet 9 will also stop, so that the pressure within the outlet 9 will rise quickly.

This quickly rising pressure raises the pressure in the control valve lower pressure chamber 67 via the outlet pressure introducing tube 13 and the control valve lower pressure duct 22, hence the diaphragm 68 and the control valve shaft 63 integrally coupled thereto are pushed up to make the control valve port 61 largely open the gap at its bottom. As a result, a flow rate of the source pressure gas flowing from the control valve source pressure duct 35 to the control valve output duct 39 increases, so that the source pressure gas is ejected from the injector nozzle 41 at a high speed, and a degree of vacuum at this portion is raised abnormally.

Under this condition, if the pinch rubber 49 is opened for the purpose of commencing the operation, then the pressure in the outlet 9 will be lowered quickly, so that the fluidized powder 51 in the tank 50 is sucked at a large rate through the detector tubular passageway 1, and thereby the flow rate of the powder is quickly increased.

In this way, the carrier gas and the powder begin to flow through the detector tubular passageway 1 towards the outlet 9, and in addition, when a purging gas begins to flow through the outlet presssure introducing tube 13 towards the outlet 9, the pressure at the outlet 9 is lowered quickly, and the flow rate of the powder flowing through the detector tubular passageway 1 returns to a normal state value.

Thereafter, if the pinch rubber 49 is closed again, the flow rate of the powder becomes zero and the pressure at the outlet 9 rises in the above-described manner.

Figure 8:
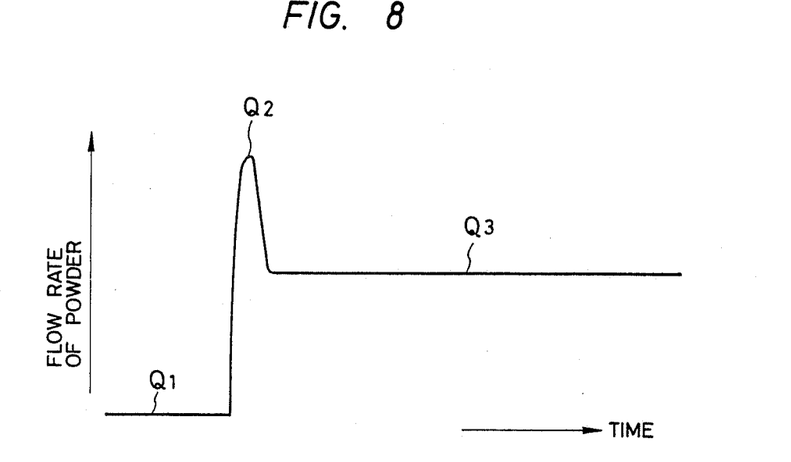
FIG. 8 is a diagram showing a starting characteristic relating to a powder feed rate of the same apparatus in the prior art.

The variation with time of the powder flow rate at this time is shown in FIG. 8. In this figure, the state where the powder flow rate is zero when the pinch rubber 49 is closed and the operation is stopped is shown at $Q_1$. The powder flow rate immediately after the pinch rubber 49 in a closed condition has been opened, is shown at $Q_2$. In addition, the powder flow rate during a normal operation is shown at $Q_3$.

SUMMARY OF THE INVENTION

One object of the present invention is to eliminate the transient increase of a powder flow rate produced upon starting the above-described apparatus in the prior art for recommencing operation of the apparatus after its operation was stopped, so that a stable powder flow rate may be obtained from the moment of starting.

According to one feature of the present invention, there is provided an automatic powder feeding apparatus of the type that the apparatus comprises a nozzle for blowing a carrier fluid into an inlet of a detector tubular passageway having an inlet and an outlet, means for detecting a pressure difference between an inlet side pressure detecting port provided upstream of the outlet of the nozzle and an outlet side pressure detecting port provided at the outlet of the detector tubular passageway, means for shunting a part of the carrier fluid to the inlet side pressure detecting port and regulating a pressure at the outlet of the detector tubular passageway, means for regulating a pressure at the inlet of the detector tubular passageway. The means for regulating a pressure at the outlet of the detector tubular passageway being an injector connected via a valve to the outlet, and an automatic control valve having the pressure difference applied as its input and a flow rate of a driving fluid of the injector issued as its control output and including means for presetting a set value corresponding to the pressure difference, in which the above-mentioned automatic control valve and the above-mentioned output side pressure detecting port are connected to each other via a three-way valve.

In the apparatus according to the present invention, when the valve interposed between the above-described outlet of the detector tubular passageway and the injector is closed in order to switch the apparatus from an operating condition to a stop condition, the carrier gas and the powder flowing through the detector tubular passageway towards its outlet and the purging gas flowing into the same outlet would respectively cease to flow and their dynamic pressures would act upon the outlet, resulting in a rise of the pressure in this portion. However, since the passageway between the outlet side pressure detecting port and the automatic control valve for controlling the flow rate of the driving fluid of the injector is closed by the three-way valve provided therebetween so that the high pressure at the outlet is not transmitted to the automatic control valve, the flow rate of the driving fluid of the injector would not be increased, and the inlet portion of the injector can hold the degree of vacuum under the operating condition.

Under the above-mentioned condition, if the above-described valve is opened, the pressure at the outlet of the detector tubular passsageway communicates with the injector, hence the pressure become equal to that under the operating condition, and sucks the carrier gas and the powder in the detector tubular passageway towards the outlet.

Since the present invention has the above-mentioned feature, if the valve interposed between the outlet of the detector tubular passageway and the injector is closed by closing the three-way valve upon stopping the operation, then the pressure rise at the outlet produced by the switching would not be transmitted to the automatic control valve, hence the flow rate of the driving fluid of the injector would increase, and a degree of vacuum at the inlet of the injector can be held at the value during a normal operation.

Accordingly, upon recommencing operation, when the valve between the outlet of the detector tubular passageway and the injector is opened, the degree of vacuum at the outlet would not be raised abnormally, but the apparatus can be operated while maintaining the degree of vacuum during a normal operation, and the temporary increase of the powder flow rate upon starting of operation as is the case with the apparatus in the prior art, can be prevented.

DESCRIPTION OF THE PREFERRED EMBODIMENTS

Figure 1:
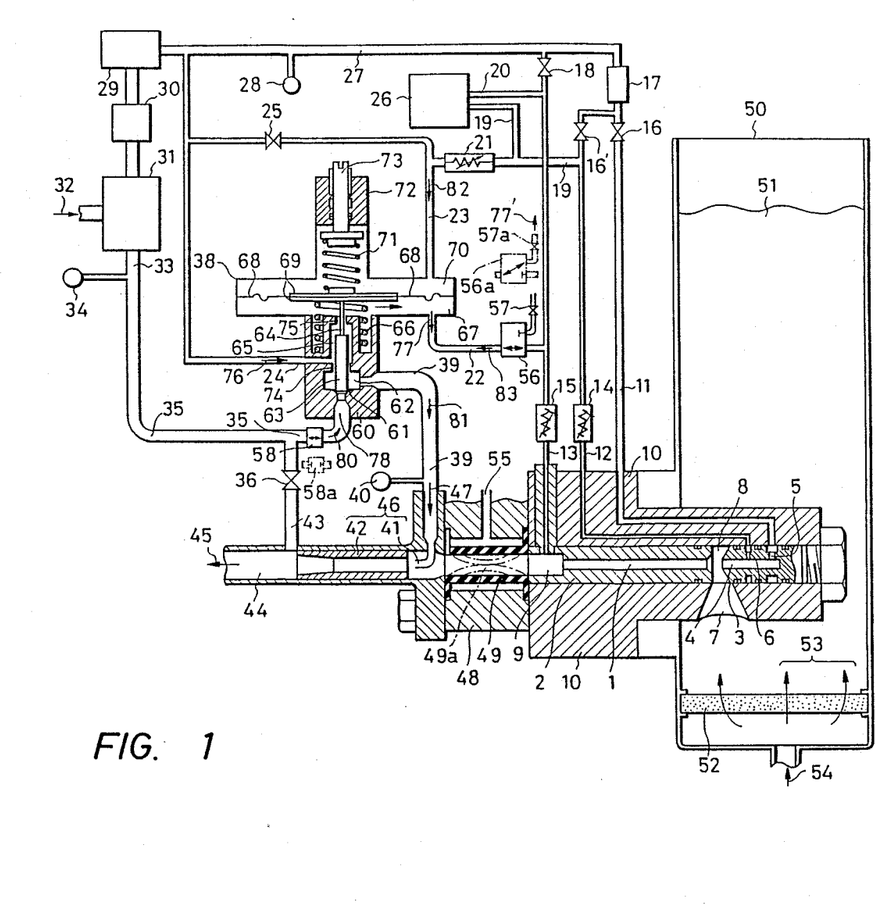
FIG. 1 is a front view, partly in cross-section, of an apparatus according to the present invention.
Figure 6:
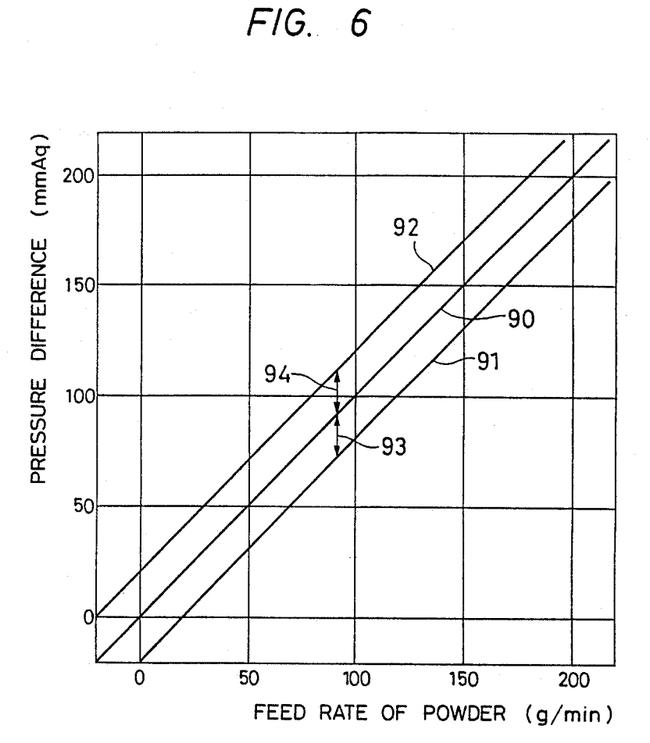
FIG. 6 is a diagram showing relations between a pressure difference and a powder feed rate in a powder flow rate measuring apparatus according to the present invention.

In a powder flow rate measuring apparatus according to the present invention, as shown in FIG. 1 a detector tubular passageway 1 formed as a narrow passageway having a circular cross-section drilled along an axis of a sensor tube 2. For the sensor tube 2, normally fluorine resin such as Teflon$^R$ or the like to which powder would hardly adhere, is employed. However, when the powder to be measured is a non-adhesive powder such as fluorine resin, polyethylene or the like, in some cases other wear-resistive materials are used, and, depending upon the kind of the powder to be measured, sometimes wear-resistive ceramics or like materials are employed. A sensor nozzle 3 for feeding a carrier gas into the detector tubular passageway 1 has at its center a sensor nozzle port 4 that is coaxial with the detector tubular passageway 1, and a carrier gas having its flow rate regulated by a valve 16 is introduced thereto through a carrier gas feed port 5. In addition, an inlet pressure detecting port 6 opens upstream of the sensor nozzle port 4 of the sensor nozzle 3, and a part of the carrier gas having its flow rate controlled by a valve 16' is fed to that port 6 via an inlet side fluid resistance 14 and through a tubular passageway 12. In this case, as shown in FIG. 1, a flow meter 17 is connected in such manner that the total flow rate of a carrier gas which flows through the valves 16 and 16' and is finally blown into the detector tubular passageway 1 as joining together through the sensor nozzle port 4, can be measured. As shown in the figure, the sensor tube 2 is supported coaxially with the sensor nozzle 3 and fixed in position in the axial direction by a sensor body 10. A powder layer 51 in a tank 50 is fluidized by gas 54 fed through a perforated plate 52 disposed at the bottom of the tank 50 as shown by arrows 53, and the powder in the powder layer 51 is introduced through a powder introducing port 7 towards an inlet 8 of the detector tubular passageway 1 between the sensor tube 2 and the sensor nozzle 3. The sensor body 10 is fixedly mounted to the tank 50. At the outlet 9 of the sensor tube 2 an outlet side pressure duct 13 communicates and a predetermined gas is adapted to be introduced to this outlet 9 via an outlet side fluid resistance 15 as controlled by an outlet pressure shift valve 18. It is to be noted that the reference numeral 26 designates a diaphragm type differential pressure gauge, and this gauge is adapted to detect a difference between the pressures at the detector tubular passageway outlet 9 and at the detector tubular passageway inlet 8, which are respectively picked up in the outlet side pressure duct 13 and in the inlet pressure detecting port 6 and applied to the differential pressure gauge through a differential pressure gauge lower pressure duct 20 and a differential pressure gauge higher pressure duct 19, respectively. The pressure difference detected by the differential pressure gauge 26 in the above-described manner, is a pressure difference generated in the process in which powder is introduced through the powder introducing port 7 into the detector tubular passageway 1 and is accelerated by a carrier gas blown into the detector tubular passageway 1 through the sensor nozzle port 4. In this instance, a favorable linear relation, as indicated by a data line 90 in FIG. 6, exists between a flow rate of the powder flowing through the detector tubular passageway 1 and a pressure difference detected by the differential pressure gauge 26. In this diagram, the gradient of the data line 90 will vary in proportion to the flow rate of the carrier gas flowing through the flow meter 17, and also the data line 90 will shift upwards in proportion to the flow rate of the gas flowing through the inlet side fluid resistance 14 as shown by arrows 94 and will shift downwards in proportion to the flow rate of the gas flowing through the outlet side fluid resistance 15 as shown by arrows 93. Accordingly, the data line is made to shift so as to pass the origin in FIG. 6 by appropriately adjusting the valves 16' and 18. If the flow rate of the carrier gas blown into the detector tubular passageway 1 is known by means of the flow meter 17, it is possible to measure a powder flow rate on the basis of a reading of the differential pressure gauge 26 by making use of the known data line 90 in FIG. 6.

In addition, to the outlet 9 of the sensor tube 2 an injector 46 is connected via a pinch rubber 49.

This pinch rubber 49 is contained in a pinch valve body 48 and communicates with a pressurizing hole 55 drilled in the pinch valve body 48. By feeding and extracting pressurized air acting upon the outside of the pinch rubber 49 through the pressurizing hole 55, the passageway on the inside of the pinch rubber 49 is closed and opened. In FIG. 1, a pinch rubber 49a depicted by dash-dot lines shows a closed state of the pinch rubber 49 as a result of elastic deformation.

In the powder flow rate measuring apparatus according to the present invention shown in FIG. 1, in the case where it is desired to change the flow rate of the powder, it is achieved by changing the flow rate of a driving gas 47 in an injector 46 consisting of an injector nozzle 41 and an injector throat 42 while the pinch rubber 49 is kept open as shown by solid lines, and by adjusting the degree of vacuum at the outlet 9 of the detector tubular passageway 1. In the event that the transporting speed of powder is too low in the transporting pipe 44 at the injector outlet, an appropriate transporting speed could be realized by providing a carrier gas adjusting duct 43 at the outlet of the injector throat 42 and introducing an additional carrier gas through this duct 43. In this case, the flow rate of the additional carrier gas can be set by means of a carrier gas adjusting valve 36. In FIG. 1, the control valve 38 is a control valve used for the purpose of maintaining a powder flow rate detected by the powder flow rate measuring apparatus according to the present invention at a predetermined constant value. More particularly, the control valve 38 operates in such manner that it compares the difference between the pressures introduced, respectively, through the control valve lower pressure duct 22 and the control valve higher pressure duct 23 with a preset value stored therein. It amplifies the pressure difference by means of a diaphragm contained therein, as a result it converts a source pressure applied through a control valve source pressure duct 35 and controlled at a fixed value into the driving gas 47, and it feeds the driving gas 47 to the injector 46. In addition, a control valve constant pressure duct 24 is the duct for introducing into the control apparatus a constant pressure which is necessary for the control valve to precisely amplify a minute gas pressure difference and reveal its function. Also, the valve 25 is a powder flow rate setting valve for making a constant pressure gas delivered by the constant pressure valve 29 flow through a fluid resistance 21 and for adding this pressure to the pressure at the inlet side pressure detecting port 6 that is given by the duct 19, for the purpose of setting.

As controlled by this powder flow rate setting valve 25, a constant minute flow rate of gas passes through a powder flow rate setting fluid resistance 21, then passes through the differential pressure gauge higher pressure duct 19, and after passing through the inlet side fluid resistance 14, it joins with a carrier gas blown into the detector tubular passageway 1 through the sensor nozzle 3, and hence, essentially it is a part of a carrier gas and could be fed in parallel to the valves 16 and 16'. However, since the flow rate is always constant, the gas feed piping connection could be made as shown in FIG. 1.

The operation of this control valve 38 is such that in the case where a level of fluidized powder 51 of the powder in the tank 50 has changed and, for instance, the flow rate of the powder has decreased, the control valve 38 acts to increase the flow rate of the driving gas 47 fed to the injector nozzle 41 and thereby restore the powder flow rate to the original value, but on the contrary, in the case where the powder flow rate has increased, the degree of vacuum in the injector is lowered by reducing the flow rate of the driving gas 47, and thereby the powder flow rate may be automatically held constant. It is to be noted that since it is necessary for the control valve 38 to function that a control valve source pressure essentially required by the control valve 38 should be precisely constant, as shown in FIG. 1 after a source pressure 32 applied to this system has been controlled at a constant pressure by the intermediary of a large-sized constant pressure valve 31, the source pressure is supplied through ducts 33 and 35. In addition, since the valves used according to the present invention such as the valves 16', 18, 25, etc. are required to operate stably for a long period at an extremely small flow rate, it is necessary that the used gas is highly cleaned. Hence the gas is fed to a constant pressure valve 29 through a precise filter 30, and it is necessary that after the gas has been controlled precisely at a constant pressure by the constant pressure valve 29 it is fed to the above-described various valves. It is a matter of course that the gas fed to this system should not contain oil drops nor dust.

In addition, a pressure gauge 34 is provided for the purpose of confirming the operation of the large-sized constant pressure valve 31. A pressure gauge 28 is provided for the purpsoe of confirming the operation of the constant pressure valve 29, and a pressure gauge 40 is provided to make known the operating condition of the control valve 38. A control valve that can be employed for directly controlling driving air at the inlet of the injector to maintain the flow rate of powder constant, must have the capability that it can operate stably in response to a minute pressure difference of about 1 mmAq and can control a flow rate of the driving gas with sufficiently high sensitivity as will be apparent from the data line in FIG. 6, and it is necessary that the control valve 38 should have a characteristic of such direction that when a positive pressure difference has been generated the flow rate of the driving fluid may be decreased. This operation has been made possible by the control valve 38 shown in FIG. 1, and for its basic operation it is necessary that an axial thrust force acting upon the valve body of the control valve for regulating the driving fluid, be constant at every position that is practically expected. This operation can be achieved by the basic structure illustrated in detail in FIG. 1.

The operation of this control valve 38 will be explained in greater detail in the following.

Referring to FIG. 1, the control valve 38 consists of a control valve higher pressure chamber 70 on the upper side and a control valve lower pressure chamber 67 on the lower side with a diaphragm 68 intervening therebetween. The central portion of the diaphragm 68 is reinforced by center plates 69. Under the control valve lower chamber 67 is provided a control valve body 60, and a control valve source pressure gas 80 having a precisely controlled constant pressure is introduced through the bottom of the body 60 via the duct 35 and a manipulating valve 58 as shown by an arrow 80.

A manipulating valve 58 shown by solid lines in FIG. 1 represents the state where the same valve is opened, while a manipulating valve 58a shown thereunder by dashdot lines represents the state where the same valve is closed.

When the above-described valve 49 has been closed, if necessary, this manipulating valve 58 is switched to the closed state of the manipulating valve 58a. Thereby the driving gas 47 ejecting from the injector nozzle 41 is stopped to prevent a degree of vacuum in the injector 46 fro rising and also prevent wasteful outflow of the driving gas 47.

Above a control valve pressure inlet 78, a control valve main shaft 63 is mounted along the central axis of the control valve body 60 so as to be slidable in the vertical direction as opposed to the control valve port 61. The upper portion of the control valve main shaft 63 transforms to a thin control valve auxiliary shaft 64, whose tip end connects to the center plate 69, and the flow rate of the source pressure gas in the control valve is controlled through a narrow gap between the entire circumference of the bottom surface of the control valve main shaft 63 and the control valve port 61 so that the source pressure gas may pass through the control valve output chamber 62 and may flow out from the control valve output chamber 39 as shown by an arrow. In this instance, the control valve main shaft 63 is mounted in an axially slidable manner via a high pressure ring gap 74. Also the auxiliary shaft 64 which is formed integrally with the control valve main shaft 63, is mounted via a low pressure ring gap 75, and as a whole, the main shaft 63 and the auxiliary shaft 64 are integrally supported in an axially slidable manner. It is to be noted that around the upper portion of the main shaft 63 and the lower portion of the auxiliary shaft 64 a control valve low pressure chamber 65 is provided, and to this chamber 65 there is applied a control valve constant pressure that is precisely controlled at a constant value lower than the controlled output 81 as shown by an arrow 76. Accordingly, upon the bottom surface of the main shaft 63 is exerted a constant thrust force caused by a control valve source pressure and adapted to raise the main shaft upwards in the axial direction, while at the top end of the main shaft 63 is generated a constant thrust force directed in the axially downward direction which is applied to the area equal to the top end area of the main shaft minus the cross-section area of the auxiliary shaft by the control valve constant pressure gas 76. Thus, as a whole, a precisely controlled constant thrust force which raises the entire shaft in the axial direction, is always generated, and thereby the tip end of the auxiliary shaft 64 raises the center plate 69. A constant resilient force of springs 66 and 71 which are preset by an upper body 72 and a setting knob 73 for determining an operating point of the shaft, is balanced with the thrust force generated by the above-described main shaft and auxiliary shaft as well as the difference between the pressures applied to the respective surfaces of the diaphragm 68 by supplied gases indicated by arrows 82 and 83, respectively, and thus the entire control valve operates. Accordingly, in this control valve, a controlled varying fluid pressure is applied only to the side surface of the control valve shaft 63 in the control valve output chamber 62. Hence the shaft 63 would not be subjected to a reaction force caused by a control operation, the position of the shaft 63 being precisely determined in response to a minute pressure difference between the respective surfaces of the diaphragm 68, and thereby an extremely accurate output can be obtained in response to an input. Although the flow rate of the gas leaking though the high pressure ring gap 74 to the control valve pressure chamber is varied by the operation of the main shaft 63, this does not become an issue because the inner pressure of the control valve constant pressure chamber is always maintained constant by the precisely controlled constant pressure gas that is fed through the control valve constant pressure duct 24. In addition, in this preferred embodiment, the gas in the control valve low pressure chamber 65 would leak through the control valve low pressure ring gap 75 to the control valve low pressure chamber 67. This gas would pass through a control valve low pressure duct 22, a three-way valve 56 and the fluid resistance 15 as shown by an arrow 77, and finally, would flow into the outlet 9 of the detector tubular passageway 1 flow rate of this gas flow is always maintained substantially constant because the inner pressure of the control valve low pressure chamber 65 is controlled at a constant pressure, and so, it does not influence the operation of this system. It is to be noted that although it is essentially necessary for the high pressure ring gap 74 to have leakage of gas therethrough, the low pressure ring gap 75 does not need to allow gas leak therethrough, and it is possible to seal the leak by means of bellows or the like. In FIG. 1, the three-way valve 56 depicted by solid lines represents the state where the control valve low pressure chamber 67 communicates with the outlet 9 of the sensor tube 2 and the control valve low pressure chamber 67 is blocked from the constant pressure device 57.

This is the state where the above-described pinch rubber 49 is opened and the subject apparatus is operating.

Also, in the same figure, the three-way valve 56a depicted by dash-dot lines represents the state where the control valve low pressure chamber 67 and the outlet 9 of the sensor tube 2 are blocked from each other and the control valve low pressure chamber 67 communicates with the constant pressure device 57.

This is the state where the above-described pinch rubber 49 is closed as depicted by dash-dot lines at 49a and the operation of the subject apparatus is stopped.

At this moment, though the pressure at the outlet 9 rises abnormally as described previously, the pressure rise is not transmitted to the control valve low pressure chamber 67. Also the control valve low pressure chamber 67 communicates with the constant pressure device 57, as described above, and is held at the pressure established by the constant pressure device 57, which pressure is nearly equal to the pressure within the tank 50 as shown in FIG. 1, the pressure within a pressurized tank not shown, or the pressure within a negative pressure tank not shown, and which pressure is somewhat higher than the pressure within the control valve low pressure chamber 67 under an operating condition.

In this way, the flow rate of the driving fluid fed through the control valve port 61 to the injector 46 can be held nearly equal to the flow rate during operation.

Therefore, a degree of vacuum at the inlet of the injector 46 also would not rise abnormally, but can be held nearly equal to that during operation.

Figure 2:
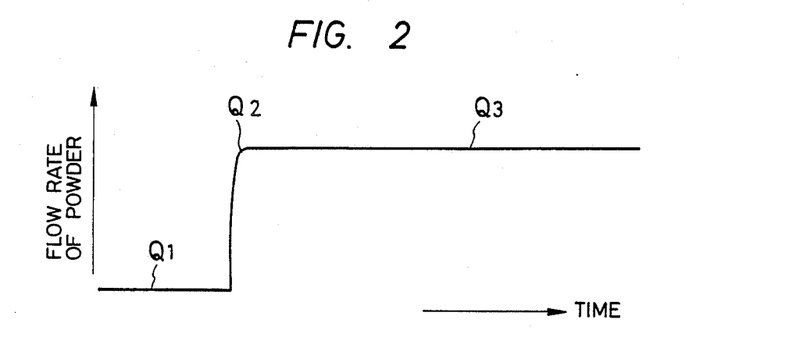
FIG. 2 is a diagram showing a starting characteristic relating to a powder feed rate of the same apparatus.

Upon recommencement of the operation, when the pinch rubber 49 has been opened, the pressure at the outlet 9 immediately becomes equal to the pressure at the inlet of the injector 46 at that moment, and so, momentary increase of the flow rate of powder flowing through the detector tubular passageway 1 as is the case with the apparatus in the prior art can be prevented. The variation of the powder flow rate as a function of lapse of time at this moment, is illustrated in FIG. 2, and it will be obvious that as compared to the previously described variation of the same in the apparatus in the prior art shown in FIG. 8, the increase of a flow rate upon starting has disappeared.

Figure 3:
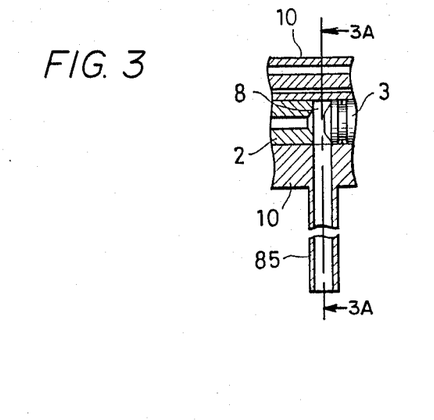
FIG. 3 is a fragmentary longitudinal cross-section view of a portion in the proximity of an inlet of a detector tubular passageway in another preferred embodiment of the present invention.
Figure 3A:
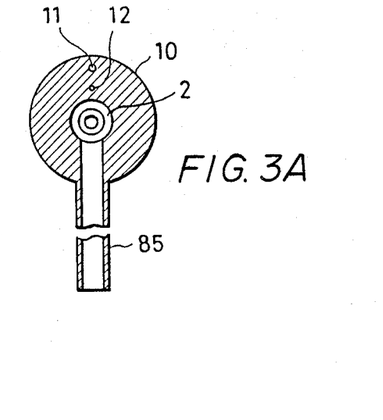
FIG. 3A is a sectional elevation view taken along the plane 3A—3A of FIG. 3.
Figure 4:
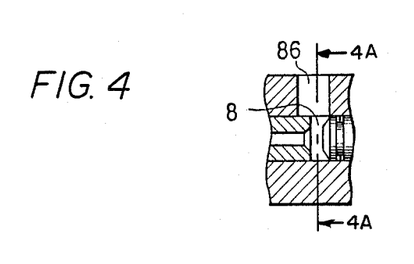
FIG. 4 shows is a fragmentary longitudinal cross-section view of a portion in the proximity of an inlet of a detector tubular passageway in still another preferred embodiment of the present invention.
Figure 4A:
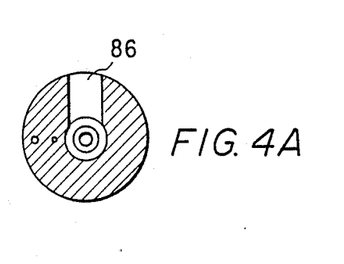
FIG. 4A is a sectional elevation view taken along the plane 4A—4A of FIG. 4.
Figure 5:
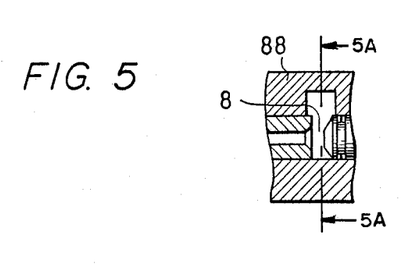
FIG. 5 is a fragmentary longitudinal cross-section view of a portion in the proximity of an inlet of a detector tubular passageway in yet another preferred embodiment of the present invention.
Figure 5A:
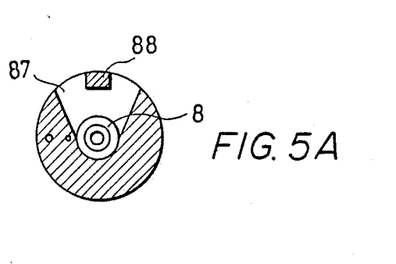
FIG. 5A is a sectional elevation view taken along the plane 5A—5A of FIG. 5.

In the powder flow rate measuring apparatus according to the present invention, in order to realize a measurement data line that is stable and excellent in linearity over a wide range of flow rates, it is extremely important to make device relate to the means for introducing powder into the inlet 8 of the detector tubular passageway 1, and preferred embodiments of the powder introducing means are as shown in FIGS. 1, 3, 4 and 5. The powder introducing port 7 shown in FIG. 1 is a diverging powder introducing port connecting the inlet 8 to a fluidized powder tank, and this is an embodiment favorable for introducing powder which has a relatively small specific gravity and is easy to be fluidized such as the conventional powder paint. The embodiment shown in FIG. 3 is a powder introducing port consisting of a thin pipe 85 which sucks and introduces powder from a fluidized powder tank to the inlet 8 of the detector tubular passageway. By employing such embodiment it becomes not always necessary to mount the entire sensor body in the proximity of the bottom of the tank, and it becomes possible to locate the entire sensor body at a position higher than the powder layer within the tank, and so, in some cases this embodiment is very convenient in handling. Also, even in the case where the sensor body is disposed at a position lower than the surface of the powder layer within the tank as shown in FIG. 1, the method of introducing powder to the inlet through a small powder introducing pipe is sometimes effective for maintaining a linear measurement data line having excellent stability over a wide range in the case of powder which is liable to generate channeling. In addition, in the case where powder having a high specific gravity becomes an object of measurement, by employing a powder introducing short pipe 86 adapted to feed powder from the above of the inlet 8 of the detector tubular passageway as shown in FIG. 4, stable feeding of powder can be realized over a wide range. Furthermore, in the case of powder having a high specific gravity, sometimes preferable results can be obtained by providing a powder introducing side port 87 for introducing powder sideways into the inlet 8 of the detector tubular passageway and disposing a powder pressure preventing member 88 right above the inlet 8 of the detector tubular passageway as shown in FIG. 5. With regard to the problem of which one of the various types of powder introducing ports shown in FIGS. 1, 3, 4 and 5 is to be employed, it is appropriate for realizing a easily operable powder flow rate detecting apparatus by obtaining an excellent linearity over a wide range that the type appropriate to the nature of the respective powder is employed by preliminarily conducting tests.

While description has been made above in connection with the system in which, as the method for regulating the powder flow rate, the pressure on the outlet side of the detector tubular passageway 1 is varied by regulating the driving fluid of the injector in the above-described embodiments, the method for regulating the powder flow rate is not limited only to such method, but it can be achieved also by varying the pressure in the inlet 8 of the detector tubular passageway. This system can be reailized, for example, by constructing the powder tank 50 in a sealed type having a leakage control valve, varying the inner pressure of the tank by controlling the leakage, and thereby varying the pressure in the inlet 8 of the detector tubular passageway.

What is claimed is:

1. An automatic powder feeding apparatus including a sensor nozzle for blowing a carrier fluid into an inlet of a detector tubular passageway having an inlet and an outlet, means for introducing powder to said tubular passageway, means for detecting a pressure difference between an inlet side pressure detecting port provided upstream of the outlet of said sensor nozzle and an outlet side pressure detecting port provided at the outlet of said detector tubular passageway, means for shunting a part of said carrier fluid to said inlet side pressure detecting port and regulating the pressure at the outlet of the detector tubular passageway, means for regulating the pressure at the inlet of the detector tubular passageway, said means for regulating the pressure at the outlet of the detecting tubular passageway being an injector connected by way of a valve to said outlet of the detector tubular passageway, and an automatic control valve having said pressure difference applied as its input and a flow rate of a driving fluid of said injector issued as its control output and including means for presetting a set value corresponding to said pressure differcnce; characterized in that said automatic control valve and said output said pressure detecting port are connected to each other by a three-way valve, having three connecting ports with the automatic control valve connected to a first one of said ports of the three-way valve and the output side pressure detecting port connected to a second one of said ports of the three-way valve.

2. An automatic powder feeding apparatus as claimed in claim 1, characterized in that the three-way valve connected to the automatic control valve and the outlet side pressure detecting port has a third one of said ports communicating with the atmosphere.

3. An automatic powder feeding apparatus as claimed in claim 1, characterized in that the three-way valve connected to the automatic control valve and the outlet side pressure detecting port has the third connecting port communicating via a valve with the atmosphere.

4. An automatic powder feeding apparatus as claimed in claim 1, characterized in that the inlet side pressure detecting port and the flow rate measuring means communicate with each other.

5. An automatic powder feeding apparatus as claimed in claim 1, characterized in that said apparatus comprises means for regulating a pressure at the outlet of the detector tubular passageway in which the inlet side pressure detecting port and flow rate measuring means communicate with each other and/or with a means for regulating the pressure at the inlet of the detector tubular passageway.

6. An automatic powder feeding apparatus as claimed in claim 5, characterized in that the means for regulating a pressure at the outlet of the detector tubular passageway is an injector consisting of a throat and a driving nozzle.

7. An automatic powder feeding apparatus as claimed in claim 1, characterized in that the means for introducing powder is a powder tube having a tubular passageway that is nearly vertical and has an inlet at its lower portion.

8. an automatic powder feeding apparatus as claimed in claim 1, characterized in that the means for introducing powder is a nearly vertical short pipe communicating with a powder layer and having an outlet at its upper portion.

9. An automatic powder feeding apparatus as claimed in claim 1, characterized in that the means for introducing powder is a powder feeding side tube having a powder pressure preventing member right above the inlet of the detector tubular passageway and communicating sideways with a powder layer.

10. An automatic powder feeding apparatus as claimed in claim 1, characterized in that the means for introducing powder is a short pipe opening into the carrier fluid ahead of the inlet of the detector tubular passageway, said pipe communicating with a powder layer.

11. An automatic powder feeding apparatus as claimed in claim 4, characterized in that said apparatus comprises means for regulating a pressure at the outlet of the detector tubular passageway in which the inlet side pressure detecting port and flow rate measuring means are communicated with each other and/or with a means for regulating a pressure at the inlet of the detector tubular passageway.

12. An automatic powder feeding apparatus as claimed in claim 1, characterized in that the means for regulating a pressure at the outlet of the detector tubular passageway is an injector consisting of a throat and a driving nozzle.

* * * * *

UNITED STATES PATENT AND TRADEMARK OFFICE
CERTIFICATE OF CORRECTION

PATENT NO. : 4,747,731

DATED : May 31, 1988

INVENTOR(S) : Hideo Nagasaka et al.

It is certified that error appears in the above-identified patent and that said Letters Patent is hereby corrected as shown below:

Column 1, line 46:
    After "having" insert --and--
Column 1, line 54:
    "pot" should be --port--
Column 2, line 49:
    "46" should be --47--
Column 2, line 60:
    "velve" should be --valve--
Column 5, line 45:
    "shows" should be deleted
Column 9, line 16:
    "dashdot" should be --dash-dot--
Column 9, line 23:
    "fro" should be --from--
Column 10, line 15:
    "though" should be --through--
Column 10, line 30:
    "1 flow rate" should be --1. However, the flow rate--
Column 10, lines 36 and 37:
    "theretrough" should be --therethrough--
Column 10, line 65:
    "the tank" should be --the open tank--
Column 11, line 26:
    After "make" insert --the--
Column 12, line 1:
    "a" should be --an--

UNITED STATES PATENT AND TRADEMARK OFFICE
CERTIFICATE OF CORRECTION

PATENT NO. : 4,747,731

DATED : May 31, 1988

INVENTOR(S) : Hideo Nagasaka et al.

It is certified that error appears in the above-identified patent and that said Letters Patent is hereby corrected as shown below:

Column 13, line 13:
"an" should be --An--

Signed and Sealed this

Seventh Day of February, 1989

Attest:

DONALD J. QUIGG

*Attesting Officer*      *Commissioner of Patents and Trademarks*